United States Patent [19]

Suzuki et al.

[11] 4,236,730
[45] Dec. 2, 1980

[54] SEATBELT SYSTEM

[75] Inventors: Ichiro Suzuki, Nagoya; Masanao Motonami; Hisashi Ogawa, both of Toyota, Japan

[73] Assignee: Toyota Jidosha Kogyo Kabushiki Kaisha, Toyota, Japan

[21] Appl. No.: 37,153

[22] Filed: May 8, 1979

[30] Foreign Application Priority Data

Dec. 11, 1978 [JP] Japan .................................. 53-172001

[51] Int. Cl.³ .................... A62B 35/00; B62D 21/18
[52] U.S. Cl. ..................................... 280/804; 297/469
[58] Field of Search ...................... 280/804, 803, 802; 180/270, 268; 297/482, 483, 484, 469; 74/30, 29; 16/93 D, 93 R, 95 R, 95 D, 96; 104/93, 89, 110, 106, 165

[56] References Cited

U.S. PATENT DOCUMENTS

| | | | |
|---|---|---|---|
| 3,074,356 | 1/1963 | Parker et al. | 16/95 R |
| 3,889,971 | 6/1975 | Kazaoka et al. | 280/804 |
| 4,004,829 | 1/1977 | Kato et al. | 280/802 |

FOREIGN PATENT DOCUMENTS 1270430 6/1968 Fed. Rep. of Germany .......... 297/483
1367248 9/1974 United Kingdom ..................... 297/483

*Primary Examiner*—John A. Pekar
*Attorney, Agent, or Firm*—Koda and Androlia

[57] ABSTRACT

A seatbelt system which includes an anchor plate which anchors one under the passenger restraining belt and which is fastened to a runner piece which moves along a guide rail fastened to a motor vehicle body. When the anchor plate receives a driving force, the anchor plate moves along the guide rail so that the belt is automatically fastened about the passenger. The seatbelt system is further arranged and configured such that a belt anchoring portion of the anchor plate and a portion of the runner piece that is directly supported by the guide rail are both provided on a straight line which coincides with the line of action of belt tension during a vehicular emergency whereby belt tension is securely supported by the guide rail.

9 Claims, 4 Drawing Figures

SEATBELT SYSTEM

BACKGROUND OF THE INVENTION

1. Field of Invention

This invention relates to seatbelt systems and more particularly to seatbelt systems which fasten and unfasten the belt around the passenger of a motor vehicle.

2. Prior Art

Seatbelt systems use a passenger restraining belt to restrain and protect the passenger during vehicular emergencies. Such systems are arranged so that the passenger will not collide with dangerous objects during a vehicular emergency. However, the percentage of passengers who wear seatbelts is very low because of the difficulty in donning the belt, etc.

As a result, seatbelt systems have been proposed which make it possible to automatically fasten the passenger restraining belt around the passenger after the passenger has seated himself in the vehicle. In such seatbelt systems, a guide rail is fastened to the vehicle body and the movement of the runner piece is guided by the guide rail. An anchor plate which anchors the outer end of the belt is fastened to the runner piece. In this way, the belt can be caused to approach or move away from the passenger so that the belt is automatically fastened or unfastened from the passenger.

In such seatbelt systems, as in ordinary manually fastened seatbelt systems, it is necessary that the anchor plate be able to insure that the belt tension is securely supported by the motor vehicle body. Specifically, during an emergency such as a vehicle collision, the initial force of impact causes the passenger to apply a large tension to the belt. Accordingly, it is necessary to support this large tension securely with the vehicle body so that the restraint of the passenger is insured.

However in the case of anchor plates and runner pieces used in conventional automatically fastened seatbelt systems, there is the possibility that the runner piece will slip out of the guide rail when the belt tension is increased and incomplete restraint of the passenger will result.

SUMMARY OF THE INVENTION

Accordingly it is the general object of the present invention to provide a seatbelt system in which the belt tension can be securely supported by the vehicle body without any danger of the runner piece slipping out of the guide rail.

In keeping with the principles of the present invention, the objects are accomplished by a unique seatbelt system which is designed such that the belt anchoring portion of the anchor plate and the guide rail support portion of a slider (i.e. that portion of the slider that is directly supported by the guide rail) are both positioned so that they are located at two points on a straight line which coincides with the line of action of the belt tension. Accordingly, when the belt tension is transmitted to the runner piece and to the slider, the runner piece is secured supported by the guide rail.

BRIEF DESCRIPTION OF THE DRAWINGS

The above mentioned features and objects of the present invention will become more apparent with reference to the following description taken in conjunction with the accompanying drawings wherein like reference numerals denote like elements end in which.

DETAILED DESCRIPTION OF THE INVENTION

Figure 1:
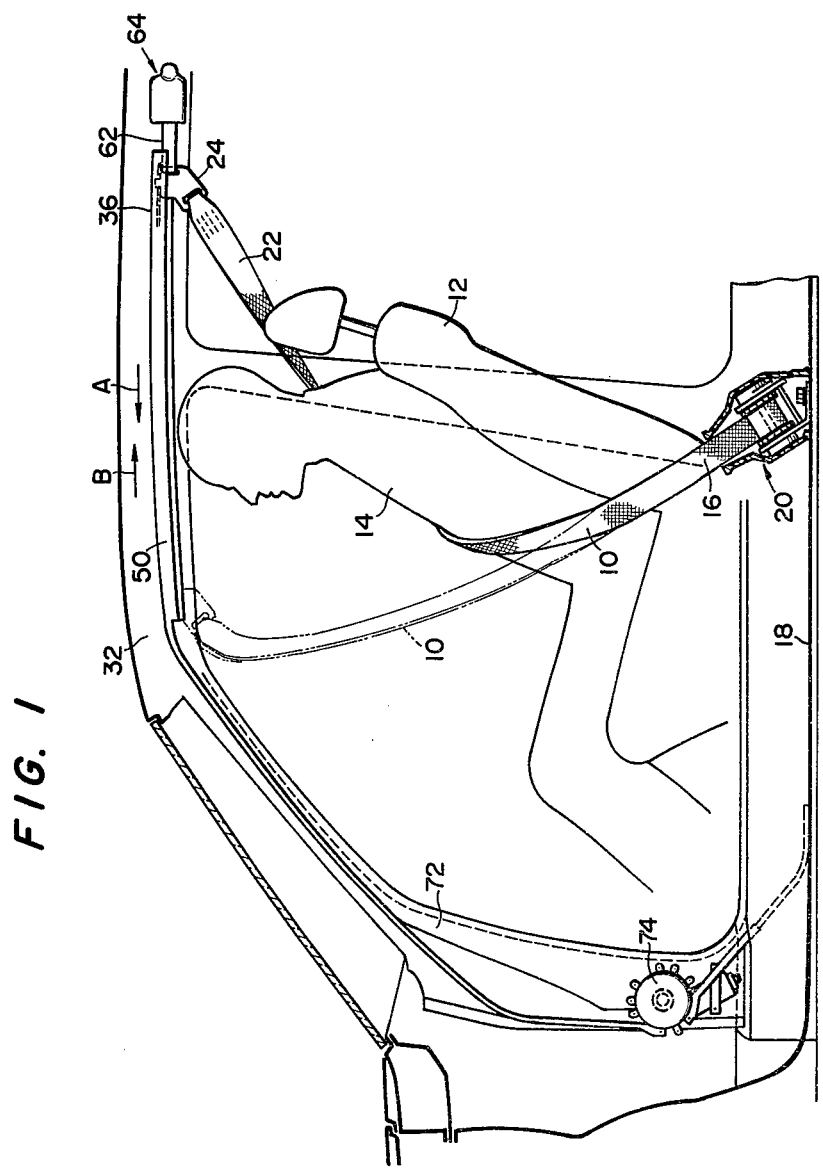
FIG. 1 is a side view of the interior of the passenger compartment which illustrates one embodiment of the seatbelt system in accordance with the teachings of the present invention.

Referring more particularly to the drawings, shown in FIG. 1 is a seatbelt system in accordance with the teachings of the present invention. In FIG. 1, the seatbelt system includes a passenger restraining belt 10 fastened diagonally across the passenger 14 who is seated in the passenger seat 12; i.e., the passenger 14 is wearing the belt 10. The inner end 16 of the belt 10 is retracted by a retractor mechanism 20 which is fastened to the floor 18 of the vehicle. The retractor mechanism 20 is installed at the approximate center of the vehicle and power retracts the belt 10. Furthermore, the retractor mechanism 20 also contains an inertial locking mechanism which abruptly stops the extension of the belt 10 during a vehicular emergency.

The outer end 22 of belt 10 is anchored to anchor plate 24 by being folded back on itself through an opening 26 in anchor plate 24 and being sewn together. The anchor plate 24 is fastened to a runner piece 28 via a pair of fastening rivets 30 which project from the runner piece 28. The runner piece 28 is provided within a guide rail 34 which is roughly C-shaped in cross section. The guide rail 34 is installed along the roof side 32 of the vehicle. The runner piece 28 is installed so that it can move back and forth in the direction of the longitudinal axis of the vehicle; i.e., such that it can move in the direction indicated by the arrows A and B in FIG. 1.

Figure 2:
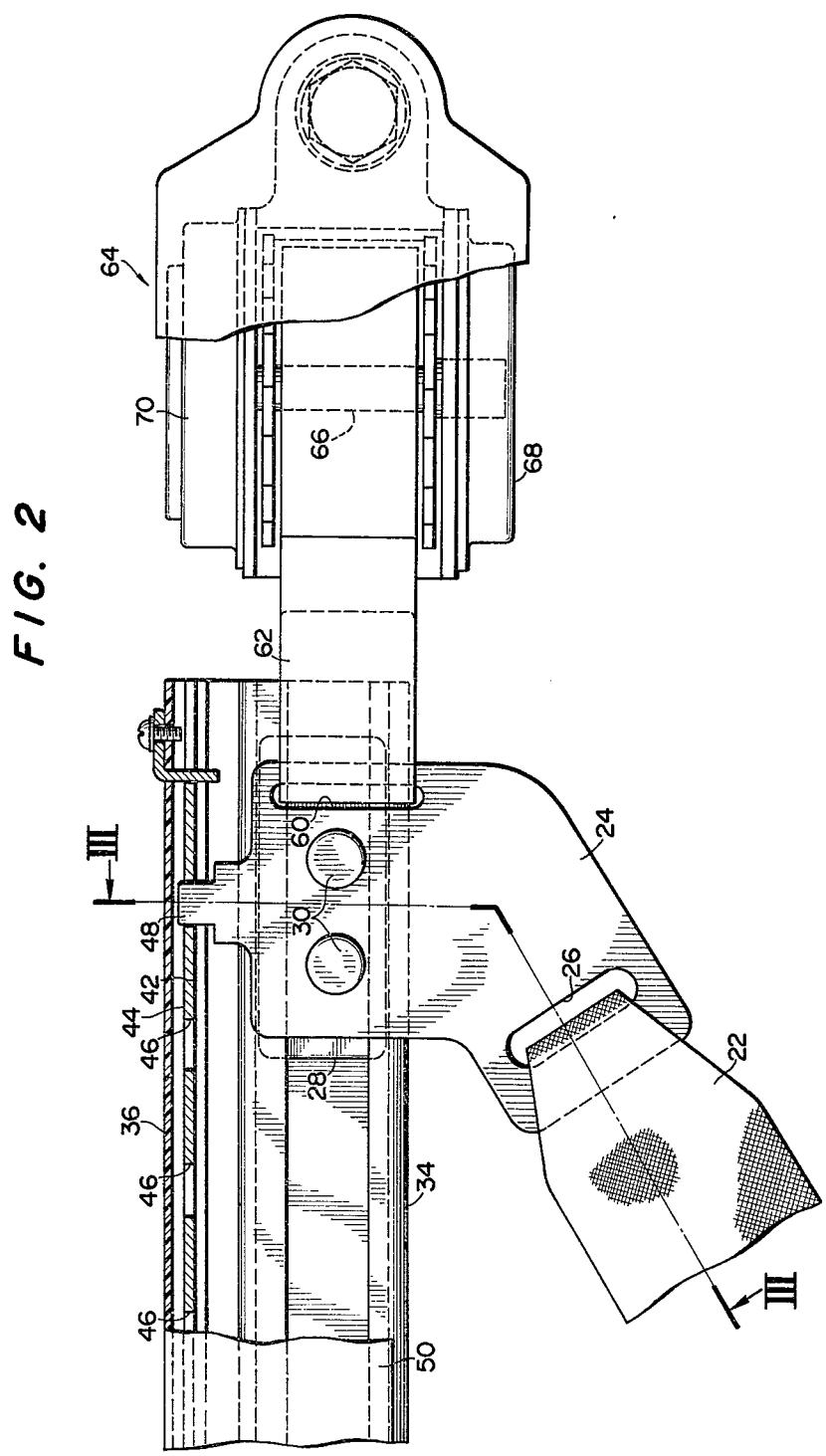
FIG. 2 is a magnified cross section representing a portion of FIG. 1.
Figure 3:
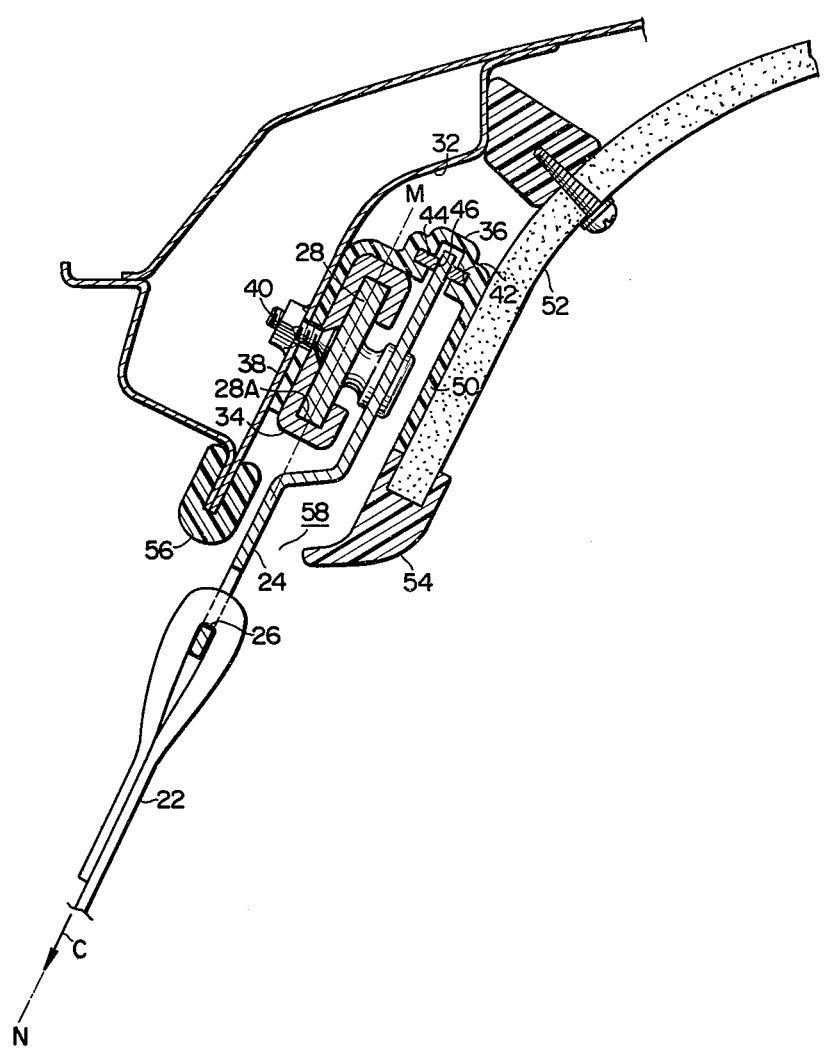
FIG. 3 is a cross section along the line III—III in FIG. 2.

Here, as is shown in detail in FIG. 3, the central portion of the anchor plate 24 is bent in cross section so that the ends of the anchor plate 24 are parallel but not in line. Thus, the portion of the anchor plate 24 that anchors the outer end 22 of the belt 10 and the portion 28A of the runner piece 28 that is directly supported by the guide rail 34 are both positioned on the line of action of the belt tension, line MN in FIG. 3. The guard rail 34 is fastened along with the fastening flange 38 of a plate guide rail 36 to the roof side 32 of the vehicle by means of fastening screws 40. The tape guide rail 36 extends toward the vehicle interior along the left of the guide rail 34. Tape grooves 42 are also provided along the length of the tape guide rail 36 and a flexible tape 44 is inserted in the tape grooves 42 so that the tape 44 can move in the longitudinal direction of the grooves 42. A plurality of rectangular openings 46 are formed at regular intervals along the length of the flexible tape 44. As shown in FIG. 2, an engaging projection 48, which projects from a portion of the achor plate 24, is inserted into one of the openings 46. Therefore, the anchor plate 24 moves together with the flexible tape 44 in a direction of longitudinal access of the vehicle.

Furthermore, an extension 50 is caused to project downwardly from the tape guide rail 36 on the opposite side of the tape guide rail 36 from the fastening flange 38. This extension 50 exerts a force against the roof lining 52 so that the roof lining 52 is held away from the anchor plate 24. As a result, a slit 58 is formed between a garnish 54 which is fastened to the lower end of the roof lining 52 and a garnish 56 which is fastened to the lower end of the roof side 32. Accordingly, a space is formed so that the anchor plate 24 can move back and forth in the direction of the longitudinal of the vehicle.

As is further shown in FIG. 2, a slot 60 is formed in the rear end of the anchor plate 24; i.e., the end towards the rear of the vehicle. A length of narrow belt 62 is anchored to the slot 60. This narrow belt 62 is retracted by the force of a coiled spring 68 on a retractor shaft 66 of a retractor mechanism 64 which is fastened to the roof side 32 which is located to the rear of the guide rail 34. Furthermore, an inertial locking mechanism 70 is attached to the retractor mechanism 64 and the inertial locking mechanism 70 abruptly stops the extension of the narrow belt 62 during a vehicular emergency.

Figure 4:
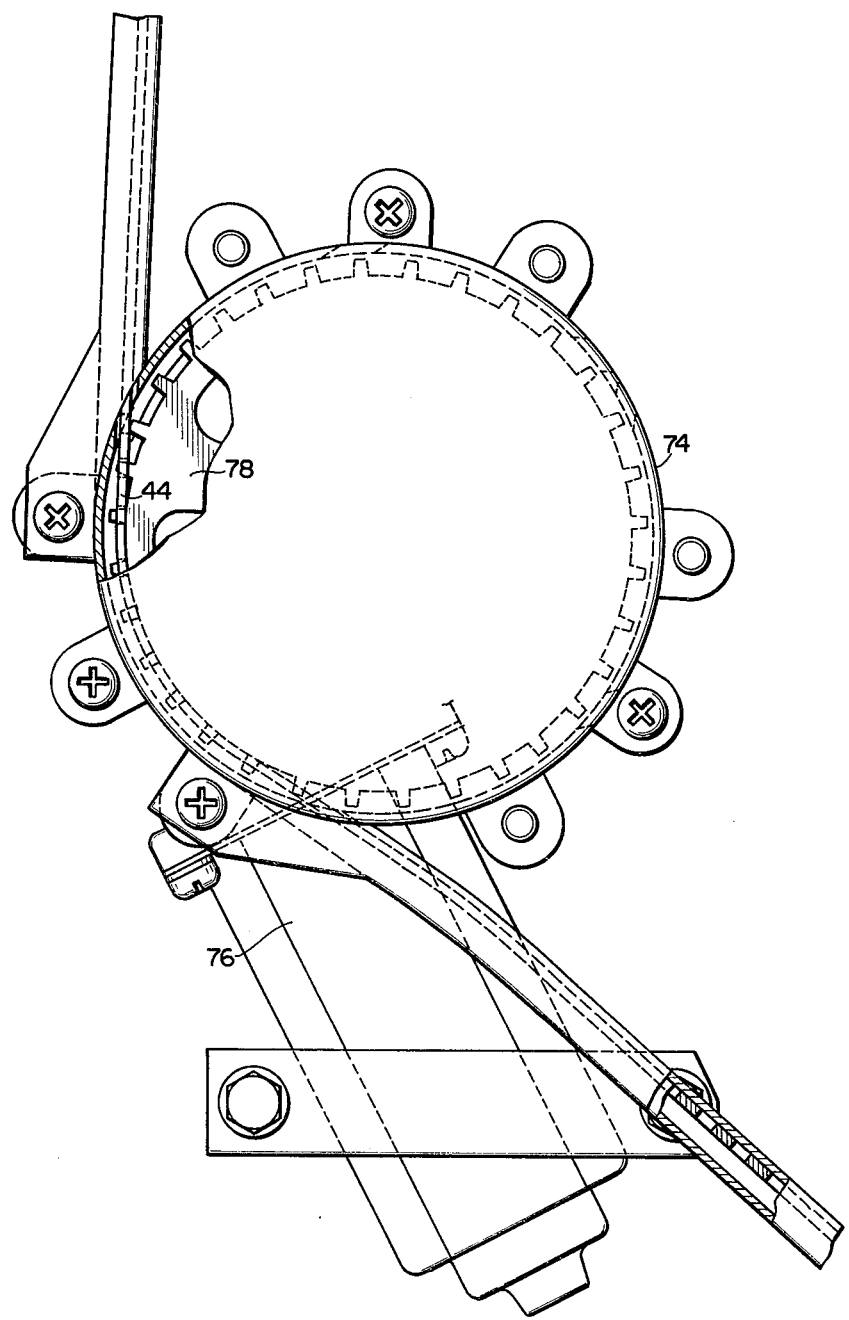
FIG. 4 is a magnified cross sectional view of a portion of FIG. 1.

As is shown in FIG. 1, the front end of the tape guide rail 36 extends downwardly along the front pillar 72 of the vehicle and is connected to a sprocket housing 72 which is fastened to the front pillar 72. A sprocket wheel 78 which is driven by a motor 76, is provided within the sprocket housing 74. The sprocket wheel 78 engages with the openings 46 and the flexible tape 44 which is guided through the tape guide rail 36. Accordingly, the driving force of the motor 76 causes the sprocket wheel 78 to move the tape 44 in the direction of the length of the tape 44. In addition, the motor 76 is caused to run when it detects that a passenger is entering or leaving the vehicle. Specifically, when a passenger closes the door after seating himself in the vehicle, the motor 76 causes the sprocket wheel 78 to rotate in a counter clockwise direction with respect to FIG. 4; conversely, when a passenger opens the door in order to leave the vehicle, the motor 76 causes the sprocket wheel 78 to revolve in a clockwise direction.

For the purposes of description of operation, it is assumed that in FIG. 1 the passenger 14 is already wearing the belt 10. Therefore under normal vehicle operating conditions, the retractor mechanism 20 and the retractor mechanism 64 allow the extension of the belt 10 and the narrow belt 62. Accordingly, the passenger 14 can freely adjust his driving position.

In operations if the vehicle becomes involved in an emergency such as a collision, etc., the retractor mechanisms 20 and 64 abruptly stop the extension of the belt 10 and narrow belt 62. Therefore, the passenger 14 is securely restrained and his safety is insured. Specifically, the initial force of the impact causes the passenger 14 to move towards the front of the vehicle. As a result, a large tension is applied to the belt 10. This tension is securely transmitted to the floor 18 of the vehicle via the inner end 16 of the belt 10 and the retractor mechanism 20. The tension is also applied to the roof side 32 via anchor plate 24, runner piece 28 and guide rail 34 which is connected at the outer end 22 of the belt 10. Accordingly, the passenger is restrained and is therefore able to avoid colliding with dangerous objects.

In this case, the portion of the anchor plate 24 that anchors the belt 10 into position along with the runner piece 28 lie on the line of action of the belt tension; i.e., on the line MN in FIG. 3. Accordingly, when a large tension is applied to the anchor plate 24 in the direction indicated by the arrow C in FIG. 3, the anchor plate 24 transmits this tension as a pressing force to the guide rail 34 via the runner piece 28. As a result, the tension on the belt 10 can be securely transmitted to the roof side member 32 via the guide rail 34 and there is no danger that the runner piece 28 will slip out of the guide rail 34.

Furthermore, when a passenger under normal conditions opens the door in order to leave the vehicle, the motor 76 drives the sprocket wheel 78 so that the tape 44 is moved. As a result the anchor plate 24 is caused to move towards the front of the vehicle in a direction indicated by the arrow A. Accordingly, a sufficient space for the passenger 14 to leave the vehicle is formed between the belt 10 and the passenger seat 12 (as indicated by the two dot chain line in FIG. 1) and the passenger is easily able to leave the vehicle. In addition, when the passenger closes the door after reentering the vehicle, the motor 76 is reversed so that the flexible tape 44 causes the anchor plate 24 to once again move into the position indicated by the solid line in FIG. 1. As a result, the belt 10 is automatically fastened around the passenger.

From the above description it is apparent that since in the seatbelt system provided by the present invention the belt anchoring portion of the anchor plate and the guide rail supported portion of the slider are both positioned in a straight line which coincides with the line of action of the belt tension, the present invention possesses certain advantages as follows: during a vehicular emergency, the belt tension is securely supported by the vehicle body without any danger of the runner piece slipping out of the guide rail.

It should be apparent to one skilled in the art that the above described embodiment is merely one of the many possible specific embodiments which represent the application of the principles of the present invention. Numerous and varried other arrangements could be readily devised by those skilled in the art without departing from the spirit and scope of the invention.

I claim:

1. A seatbelt system comprising a guide rail which is fastened to an interior of a motor vehicle body, a runner piece which is supported by said guide rail and which moves along said guide rail in a direction of the length of said guide rail, an anchor plate which is coupled to said runner piece at one end portion and which anchors one end of a passenger restraining belt at a belt anchoring portion of said anchor plate and a driving mechanism which causes said anchor plate to move along said guide rail, said seatbelt being characterized in that a central portion of said anchor plate is bent such that the one end portion and the belt anchoring portion of said anchor plate are parallel but not in line and the belt anchoring portion of said anchor plate is positioned beneath the guide rail so that said belt anchoring portion of said anchor piece and a portion of said runner piece which is directly supported by said guide rail lie on a straight line which coincides with a line of action of belt tension applied to said passenger restraining belt during a vehicular emergency.

2. A seatbelt system according to claim 1 wherein said guide rail is C-shaped in cross section and said runner piece is provided within said guide rail.

3. A seatbelt system according to claim 2 wherein said anchor plate is fastened to said runner piece by rivets which project from said runner piece.

4. A seatbelt system according to claim 1 wherein said seatbelt system further comprises a tape guide rail which is provided along said guide rail and a flexible tape which moves through said tape guide rail and which couples together said runner piece and said driving mechanism such that the driving force of said driving mechanism is transmitted to said runner piece.

5. A seatbelt system according to claim 4 wherein said tape guide rail includes a fastening flange which is fastened along with said guide rail to a roof side member of said vehicle.

6. A seatbelt system according to claim 5 wherein said runner piece is provided with a projection and said flexible tape is provided with at least one opening and said runner piece is coupled to said flexible tape by inserting said projection into said opening.

7. A seatbelt system according to claim 6 wherein a plurality of openings are formed in said flexible tape and said openings engage with a sprocket wheel which is rotated by a driving motor.

8. A seatbelt system according to claim 7 wherein said anchor plate is drawn towards the rear of said vehicle by means of a retractor mechanism which is provided to the rear of said guide rail which extends longitudinally along said interior of said vehicle body.

9. A seatbelt system according to claim 4 wherein an extension of said tape guide rail biases a roof lining towards the interior of a passenger compartment such that said roof lining is held away from said anchor plate and guide rail.

* * * * *